United States Patent [19]

Byzio et al.

[11] Patent Number: 4,675,992

[45] Date of Patent: Jun. 30, 1987

[54] METHOD AND APPARATUS FOR FORMING A SMOOTH TUBE FROM A FLAT TAPE

[75] Inventors: Edward R. Byzio; Peter Stewart-Hay, both of Winnipeg, Canada

[73] Assignee: Canada Wire and Cable Limited, Toronto, Canada

[21] Appl. No.: 856,331

[22] Filed: Apr. 28, 1986

Related U.S. Application Data

[60] Division of Ser. No. 667,062, Nov. 1, 1984, Pat. No. 4,606,119, which is a continuation of Ser. No. 371,575, Apr. 26, 1982, abandoned.

[30] Foreign Application Priority Data

Apr. 27, 1981 [CA] Canada .................................. 376346

[51] Int. Cl.[4] .............................................. B23P 19/04

[52] U.S. Cl. ....................................................... 29/728

[58] Field of Search ................. 29/828, 429, 430, 446, 29/728; 72/51, 52

[56] References Cited

U.S. PATENT DOCUMENTS 2,986,193 5/1961 Howell ................................. 29/429

FOREIGN PATENT DOCUMENTS 907417 8/1972 Canada .................................. 72/52

*Primary Examiner*—Howard Goldberg

*Assistant Examiner*—Joseph M. Gorski

*Attorney, Agent, or Firm*—Fleit, Jacobson, Cohn & Price

[57] ABSTRACT

A method and an apparatus for forming a tube from a flat tape, more particularly for forming a shielding tape around a cable core, is disclosed. The tape is moved longitudinally along a straight path and simultaneously deflected laterally from a flat to a circular configuration around a mandrel, and the center of the tape is stressed over an eccentric ring attached to the outside surface of the mandrel in substantially inverse proportion to the stretch imparted to the tape during forming of the tube.

4 Claims, 11 Drawing Figures

METHOD AND APPARATUS FOR FORMING A SMOOTH TUBE FROM A FLAT TAPE

This is a divisional of application Ser. No. 667,062 filed Nov. 1, 1984, now U.S. Pat. No. 4,606,119, which is a continuation of application Ser. No. 371,575, filed Apr. 26, 1982, now abandoned.

This invention relates to the formation of a smooth tube from a flat tape. The invention is applicable to many industries and thus is general in nature. One application of the invention is within the wire and cable industry. This application specifically relates to the formation of a thin metallic shielding tape around a cable core.

The formation of a metal tube around a cable core is well known in the telephone manufacturing industry. Historically, either a smooth or a corrugated thin metal tape was formed into an overlapped shielding tube around a cable and a plastic jacket was extruded over the tube.

The materials used were generally aluminum, copper, or steel for the thin metal tape and polyethylene or polyvinyl chloride of various molecular weights, densities, or mixtures for the plastic jacket. The vast majority of cables, however, were manufactured using aluminum for the thin metal tape and low density polyethylene for the plastic jacket.

A smooth tube was generally utilized when dealing with cable cores having diameters up to and including 0.67 inches. Cable cores of 0.68 inches and larger normally were designed with corrugated metal tapes. This allowed the metal tube to flex without cracking when the cable was bent.

The advent of coated metallic tapes changed the cable design concept with regard to the use of corrugated metal tapes. These coated metal tapes consisted of metal covered with a tightly bonded thin film of plastic similar in nature to the plastic jacket. This then allowed the plastic jacket to be bonded tightly to the plastic coated smooth tube. Therefore, the corrugating of shielding tapes was no longer required.

A smooth tube of coated metallic tape bonded to a plastic jacket has many advantages over a corrugated tube of coated or uncoated metallic tape. Some of these advantages are:

(a) A significantly improved bond between the metal tube and the plastic jacket.

(b) A reduction in the quantity of shielding material used.

(c) A reduction in direct current shield resistance per unit length.

(d) A smaller overall cable diameter.

(e) A reduction in the quantity of plastic required for the cable jacket.

(f) Tape overlap bonding provided that the overlapped surfaces of the tube are properly formed:

The fundamental problem in forming a flat tape into a smooth tube around a cable core is that the edges of the tape become longer than the centre. This occurs both by virtue of the geometry of the tape former and by the elasticity of the tape material.

Since the tape edges travel a greater distance than the centre of the tape during the formation of the tape from a flat to a circular configuration, the tape edges are stretched. This causes kinks or buckles to appear in the smooth tube which are most pronounced at the tape overlap point on the smooth tube. The kinks or buckles cause a number of problems during the plastic jacket extrusion process and after jacketing, create points of stress on the plastic jacket. This could result in a localized jacket failure and allow water to penetrate the cable core as the tape overlap would not likely be bonded at this point.

This tape edge problem is further compounded by one or more prior slitting operations which trim the tape to a required width for a particular cable core. These slitting operations stretch the tape edges in a non-uniform manner.

In the historical sense, as previously discussed, smooth tubes were formed about cable cores of 0.67 inches and smaller kinks or buckles did not present a problem for the following reasons:

(a) The narrower the tape width the less pronounced the kinks and buckles.

(b) The kinks and buckles were ironed out by the alignment and the adjustment of the final forming dies. This created sufficient friction between the dies and the tapes so as to uniformly stretch the tape.

In corrugated tape forming the tape edge stretch created by the slitting function is effectively eliminated by the corrugating operation. Since a corrugated tape is flexible, the corrugated tape edge stretch imparted during the tube forming operation is eliminated by the final forming dies. These dies compress the stretched portions of the corrugated tape.

Thus the problem of excess length of the tape at the tape edges is critical to smooth tubes only. It is most critical in cases where the cable core is 0.68 inches and larger.

One method of overcoming the problem of smooth tube forming was disclosed in Canadian Pat. No. 907,417 which was issued Aug. 15, 1972. In accordance with the teaching of that patent, the tube formed from the flat tape is stretched longitudinally in substantially inverse proportion to the longitudinal stretch imparted to the tape edge in forming the tube. This is done by passing the tube over an angled mandrel to change the direction of the path of the tube being formed from the longitudinal axis of the tube. The apparatus used to perform the above change in the direction of movement of the tube thus imparts a change in the direction of movement of the cable core which is being fed through the angled mandrel and therefore renders the cable manufacturing operation more complex.

It is the object of the present invention to form a tube from a flat tape of form-retaining material, such as aluminum, around a mandrel through which a cable core is advanced, in which there is no change in the direction of movement of the cable core or of the tape, and in which substantially no kinks or buckles of the overlapped tape edges are formed for tape widths ranging from about 3 inches to about 14 inches.

The method, in accordance with the present invention, comprises the steps of moving a tape longitudinally in a straight path and simultaneously deflecting the tape laterally from a flat to a circular configuration around a mandrel, and stressing the centre of the formed tape over an eccentric ring attached to the outside surface of the mandrel in substantially inverse proportion to the longitudinal stretch imparted to the edges of the tape in forming the tube.

Controlled stretching of the tape is preferably done by moving the tape against the mandrel and, after passing over the eccentric ring, by bringing the tape back against the mandrel. The mandrel is hollow and a cable core is fed through the mandrel into the essentially formed tube. Both the cable core and this tube are travelling at the same rate of speed once the tube exits the mandrel section. After exiting the mandrel, the edges of the tube are overlapped and the tube is sized down to conform to the cable core. The overlap edges are also preferably joined together. The plastic jacket is now extruded over this shielded cable core.

The overlapped tape edges can be joined together in a number of ways. Some of these ways are:

(a) When dealing with plastic coated tapes as previously described.
  (i) By means of a suitable heat source and external pressure before the extrusion of the plastic jacket.
  (ii) By utilizing the extruded jacket as a heat source and as an external pressure resource.
  (iii) By introducing an adhesive between the overlapped tape edges.
(b) When dealing with uncoated tapes.
  (i) By introducing an adhesive between the overlapped tape edges.
  (ii) By welding or soldering the overlapped tape edges.

The apparatus for carrying out the above tape to tube forming method comprises a cylindrical mandrel having an eccentric ring attached to the outside surface thereof, means for moving the tape longitudinally and simultaneously deflecting the tape laterally from a flat to a circular configuration around the mandrel, and means for stretching the centre of the formed tube over the eccentric ring in substantially inverse proportion to the longitudinal stretch imparted to the edges of the tape in forming the tube.

Tape deflecting or forming means may be a sheet metal trough having the natural lateral configuration of the tape being formed into a tube. However, other types of forming equipment may be used such as adjustable belts or a series of spaced parallel plate segments.

The means for stressing the essentially formed tube preferably comprises a split die which is both longitudinally and radially adjustable to the direction of the travel of the cable core and the tube. This split die is located upstream from the eccentric ring and controls the position of the tape upstream with reference to both the mandrel and the eccentric ring. The means also preferably comprises a mandrel die which is adjustable in a similar fashion to the split die and which is located downstream from the eccentric ring. This die controls the downstream position of the tape relative to the eccentric ring and the mandrel. Upon exiting the mandrel die, the tape is back against the mandrel. The apparatus also comprises an overlapping die located downstream of the mandrel for overlapping the edges of the tape and a die for sizing the tape down to the diameter of the cable core.

The invention will now be disclosed, with reference to a preferred embodiment illustrated in the accompanying drawings in which.

Figure 1:
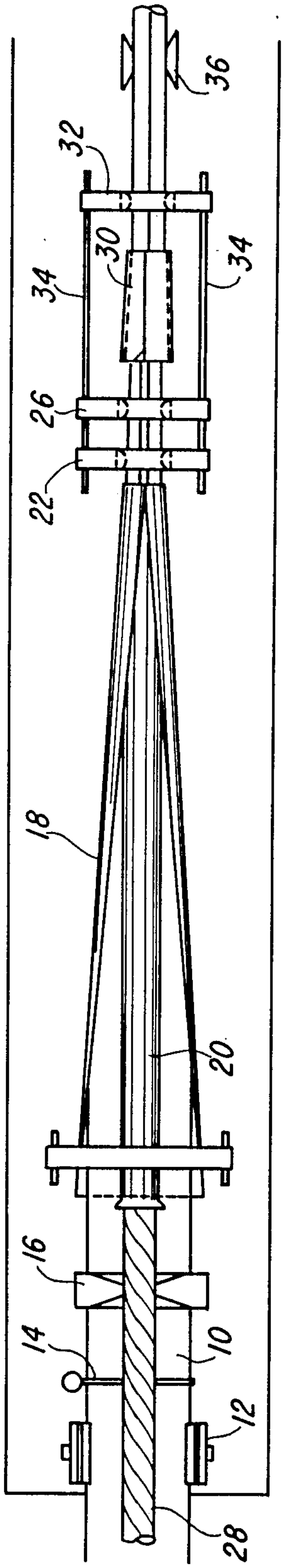
FIG. 1 is a top overall view of a smooth tape forming apparatus in accordance with the invention.

Referring to FIG. 1 of the drawings, there is shown a flat shielding tape 10 of form-retaining material such as aluminum or plastic coated aluminum construction which is supplied from a coil (not shown) using conventional pay-off equipment (not shown). The tape is guided by means of a tape guide 12 and oiled by means of an oil mist lubrification device 14 before it enters an adjustable tension device 16 which is required for optimum formation performance. The tape then enters a forming trough 18 in which it is formed from a flat to a circular configuration. It is to be understood that other types of forming equipment may be substituted such as adjustable belts or a series of spaced parallel plate segments as are commonly known in the art. The tape is formed around the mandrel tube 20 and brought in a controlled manner against the mandrel using split die 22 as shown more clearly in FIG. 2.

Figure 3:
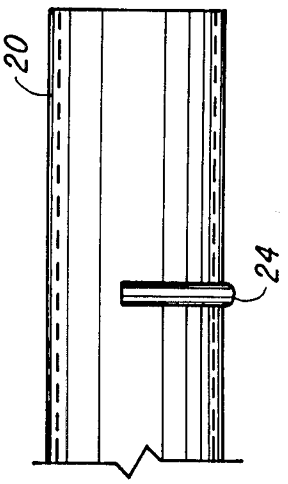
FIG. 3 is a partial side view of the mandrel tube of the apparatus shown in FIG. 1.
Figures 2, 4, 5, 6, 7:
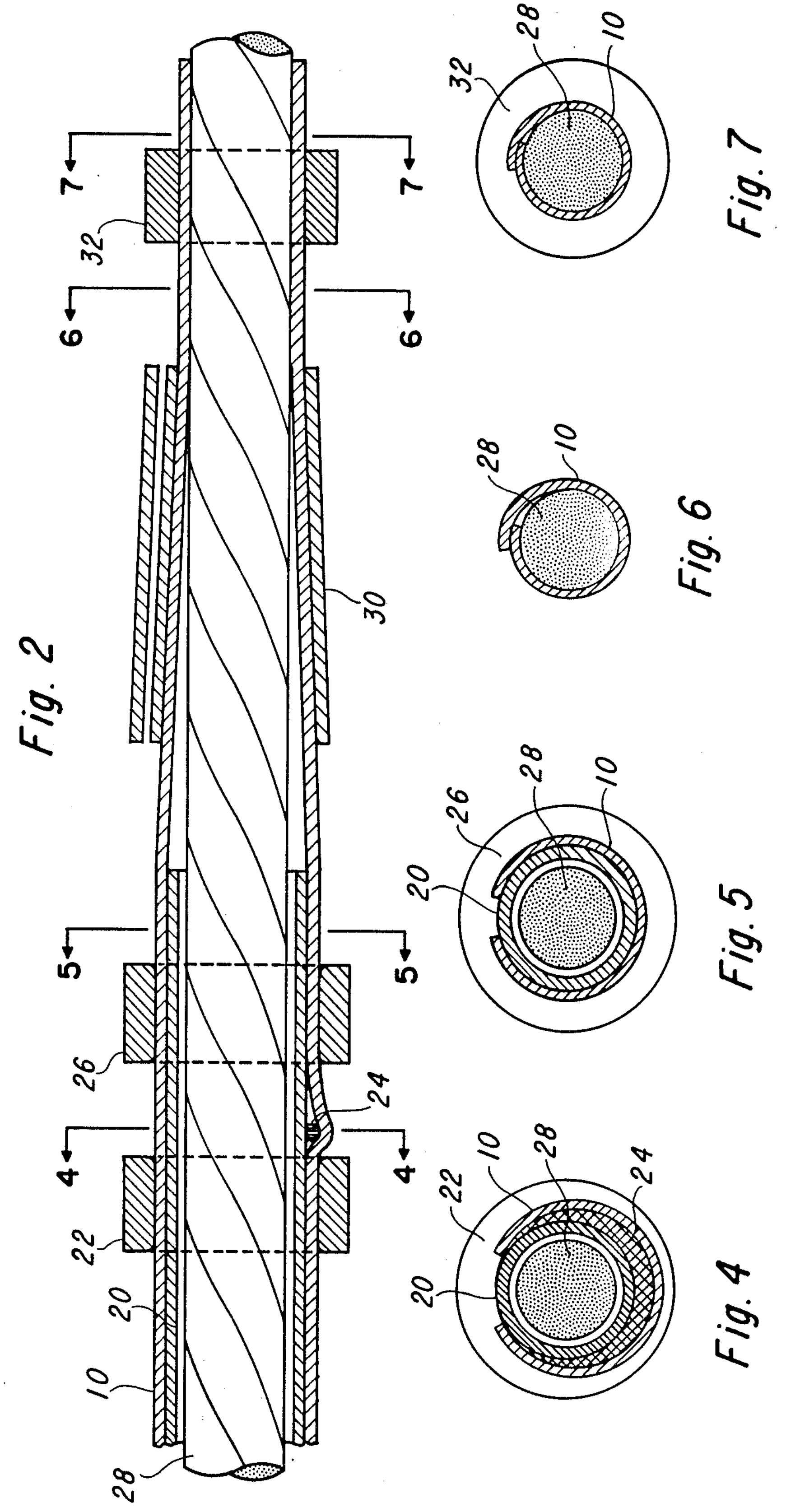
FIG. 2 is an enlarged longitudinal sectional view through a portion of the apparatus illustrated in FIG. 1.
FIGS. 4–7 are corss-sectional view taken along lines 4—4, 5—5, 6—6, and 7—7, respectively, of FIG. 2.

As shown in FIGS. 2–4, and eccentric ring 24 is attached to the mandrel tube 20 and the tape is stretched over such eccentric ring and brought back in a controlled manner against the mandrel, as shown in FIG. 5, by a mandrel die 26 located adjacent to the end of the mandrel tube 20.

A core 28 of insulated wire strands, hereinafter referred to as a cable core, is fed from a suitable supply (not shown) through the mandrel at a slightly faster speed than the tape 10. After leaving the mandrel tube 20, the shielding tape is fed through an overlapping die 30 in which the edges of the tape are overlapped, as shown in FIG. 6 of the drawings. The tape is then sized down to the diameter of the cable core by means of a final closing die 32, as shown in FIG. 7. As the tape is still forming, the distance between the mandrel die 26 and the final closing die 32 should be sufficiently long that the tape edges are not stretched. Furthermore, the mandrel tube 20, mandrel die 26, overlapping die 30 and final closing die 32 should be preferably aligned by any suitable means such as aligning rods 34. After leaving the final closing die 32, the cable with the tape around it is fed through cable support rollers 36 to conventional equipment (not shown) for sealing or bonding the tape edges.

Figure 8:
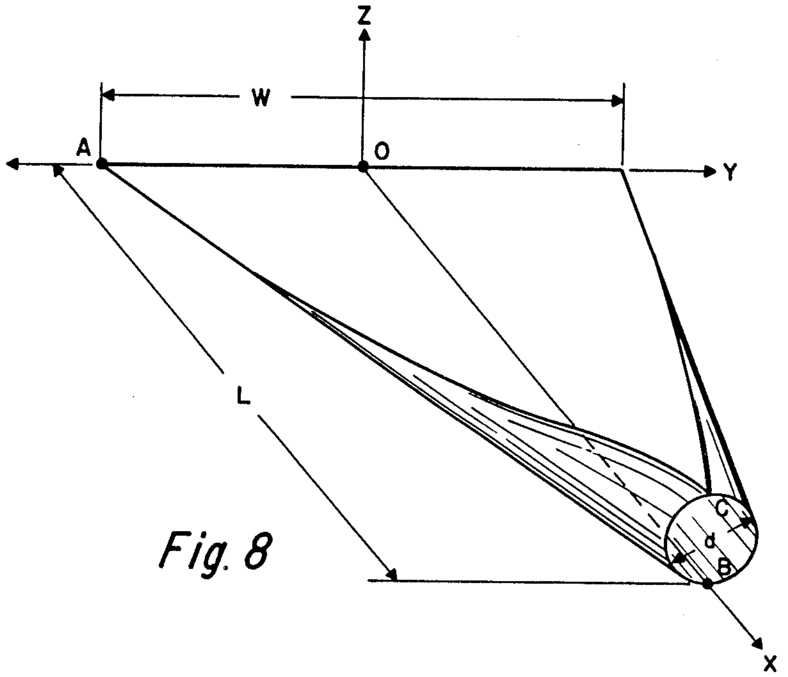
FIG. 8 is a perspective view of a smooth tape forming trough used for the derivation of the percent tape edge stretch.

Referring now to FIG. 8, the amount of tape edge stretch depends on the width of the tape and the geometry of the tape former, i.e. the forming trough 18, and can be closely approximated from the three dimensional triangle ABC:

$$AC = \sqrt{L^2 + \left(\frac{W}{2}\right)^2 + \left(\frac{\pi d}{2}\right)^2}$$

where d = cable core diameter

W = tape width

L = effective tape forming through length

Since $(\pi d)/2 = W/2$, then:

$$AC = \sqrt{L^2 + \frac{W^2}{2}}$$

The percent stretch of the tape edges is therefore:

$$\left(\frac{\sqrt{L^2 + \frac{1}{2}W^2} - L}{L}\right) 100$$

Figure 9:
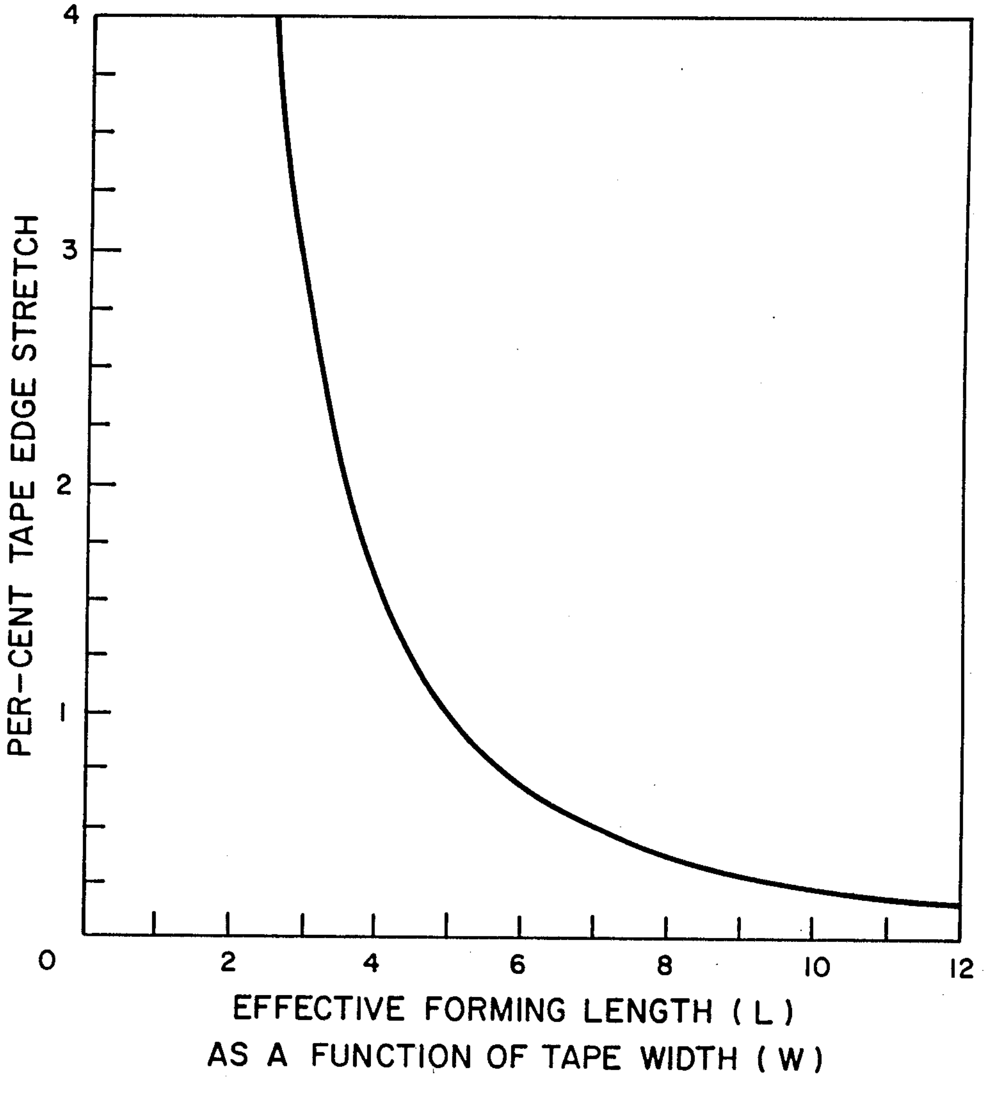
FIG. 9 illustrates the relationship between the length of the tape forming trough as a function of tape width and the percent stretch of the tape edges.

The relationship between effective length of the forming trough as a function of tape width and the percent stretch of the tape edges is illustrated in FIG. 9. It will be also understood that the maximum stretch is at the edges of the tape and that there is no stretch at the centre of the tape.

Figure 10:
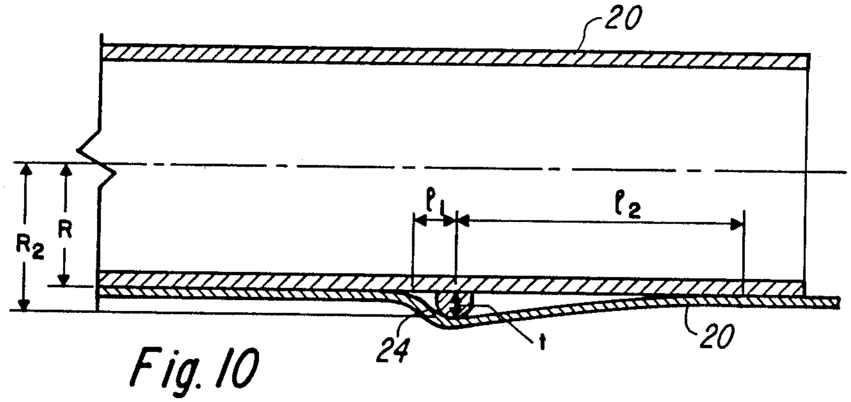
FIGS. 10 and 11 are schematic diagrams used for the derivation of the percent longitudinal and lateral tape stretch obtained with the use of the eccentric ring attached to the mandrel.
Figure 11:
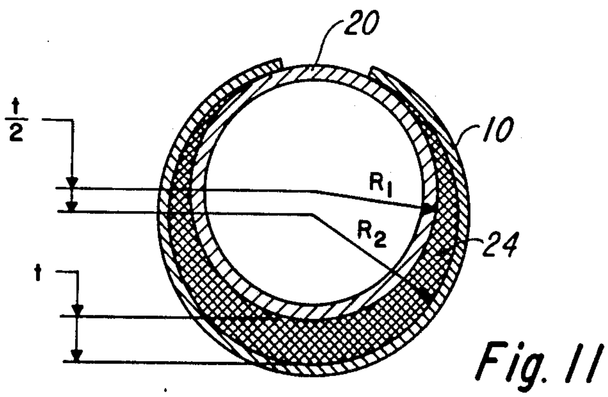

Referring now to FIGS. 10 and 11, it will be seen that the eccentric ring attached to the mandrel forces the shielding tape to stretch in both longitudinal and lateral directions. Referring to FIG. 10, the longitudinal percent stretch imparted to the tape at the maximum thickness of the eccentric ring can be closely approximated as follows:

$$\% = \frac{(\sqrt{t^2 + l_1^2} + \sqrt{t^2 + l_2^2} - (l_1 + l_2))100}{l_1 + l_2}$$

where $t$=thickness of eccentric ring $l_1 = \frac{1}{2}$ width of eccentric ring $l_2$=distance between centre of eccentric ring and leading internal edge of the parallel wall section of mandrel die for $l_1 = t$, we have:

TABLE I

| t | LONGITUDINAL PERCENT STRETCH | | |
|---|---|---|---|
| inches | $l_2$ = 1.0" | $l_2$ = 1.5" | $l_2$ = 2.0" |
| 0.050 | 2.1 | 1.4 | 1.0 |
| 0.075 | 3.2 | 2.1 | 1.6 |
| 0.100 | 4.2 | 2.8 | 2.1 |

Thus, the eccentric ring thickeness (t) and the distance between the mandrel die and the eccentric ring can be used to control the longitudinal stretch imparted to the tape by the eccentric ring so as to match the percent longitudinal stretch imparted to the edges of the tape by the tape forming trough. It would also be understood that the maximum stretch imparted to the tape is at the centre of the tape where the thickness of the eccentric ring is maximum and will decrease from the centre of the tape as the thickness of the eccentric ring decreases. Therefore, the percent stretch is inversely proportional to the longitudinal stretch imparted to the edges of the tape in forming the tube. The eccentric ring also imparts to the tape a certain amount of stretch in the lateral direction. Referring to FIG. 11, the lateral percent stretch is calculated as follows:

$$\% = \frac{R_2 - R_1}{R_1} \times 100$$

were $R_1$=radius of mandrel tube $R_2$=radius of eccentric ring

But $R_2 - R_1 = \frac{1}{2}t$,

Thus:

$$\% = \tfrac{1}{2}t/R_1 \times 100 = t/D \times 100$$

where D=outside diameter of mandrel tube

| t | LATERAL PERCENT STRETCH | | | | |
|---|---|---|---|---|---|
| inches | D = 1.5" | D = 2" | D = 2.5" | D = 3.0" | D = 3.5" |
| 0.050 | 3.3 | 2.5 | 2.0 | 1.7 | 1.4 |
| 0.075 | 5.0 | 3.8 | 3.0 | 2.5 | 2.1 |
| 0.100 | 6.7 | 5.0 | 4.0 | 3.3 | 2.9 |

Thus, the per cent lateral stretch of the tape depends on the thickness of the eccentric ring and the diameter of the mandrel tube. This percent stretch must be taken into account in selecting the initial width of the tape or in the slitting of the tape prior to forming into a tube in order to control the amount of overlap of the tape.

Although the invention has been disclosed with reference to a preferred embodiment, it is to be understood that it is not limited to such embodiment and that other alternatives are also envisaged within the scope of the claims.

We claim:

1. An apparatus for forming a tube from a flat tape of form-retaining material, said flat tape having a center portion and two edges, said apparatus comprising:

(a) a straight cylindrical mandrel having an inner surface and an outer surface, an eccentric projecton on the outer surface of the cylindrical mandrel, the eccentric projection being defined by a circular arc, having a maximum projection portion extending outwardly and transversely from the outer surface of the mandrel, and smoothly joining the outer surface of the mandrel at points that are spaced circumferentially from the maximum projection;

(b) means for moving the tape longitudinally along a straight path and simultaneously deflecting the two edges of the tape laterally toward each other around and against the cylindrical mandrel, so that forming a tube of tape is formed in which the tape is increasingly stretched longitudinally from the center portion towards the two edges;

(c) means for pressing the tube of tape over and in contact with the eccentric projection so that the center portion of the tape is passed over and in contact with the maximum projection portion of the eccentric projection, so that is longitudinally and laterally stretched inwardly of the two edges.

2. Apparatus as defined in claim 1, wherein the mandrel is tubular, and further comprising means for feeding a cable core, of a diameter smaller than that of the tube of tape, through the mandrel and into the tube of tape, thereby forming a shielded cable core.

3. An apparatus as defined in claim 2, further comprising an overlapping die located downstream of the mandrel for overlapping the edges of the tape, and a final closing die located downstream of the overlapping die for sizing the tape down to the diameter of the cable core.

4. An apparatus as defined in claim 1, wherein the means for pressing the tube preferably comprises a split die located upstream of the eccentric projection for moving the tape against the mandrel, and a mandrel die located downstream of the eccentric projection for bringing the tape back against the mandrel.

* * * * *

UNITED STATES PATENT AND TRADEMARK OFFICE
CERTIFICATE OF CORRECTION

PATENT NO. : 4,675,992

DATED : June 30, 1987

INVENTOR(S) : BYZIO et al

It is certified that error appears in the above-identified patent and that said Letters Patent is hereby corrected as shown below:

IN THE CLAIMS:

Col. 6, line 42, delete "forming";

line 49, after "that" insert --the tape--.

Signed and Sealed this

Nineteenth Day of January, 1988

*Attest:*

DONALD J. QUIGG

*Attesting Officer*

*Commissioner of Patents and Trademarks*